(12) United States Patent
Klein et al.

(10) Patent No.: US 9,987,571 B2
(45) Date of Patent: Jun. 5, 2018

(54) FILTER INSERT PIECE COMPRISING A PLEATED FILTER ELEMENT

(71) Applicant: MANN+HUMMEL GMBH, Ludwigsburg (DE)

(72) Inventors: Martin Klein, Ludwigsburg (DE); Frank Bartel, Dingolfing (DE); Jobst Eisengraeber-Pabst, Oberstenfeld (DE); Anton Kreiner, Reisbach (DE); Pamela Gohl, Remseck (DE); Lars Spelter, Ditzingen (DE); Armando Labarta, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days. days.

(21) Appl. No.: 15/351,789

(22) Filed: Nov. 15, 2016

(65) Prior Publication Data

US 2017/0056793 A1 Mar. 2, 2017

Related U.S. Application Data

(63) Continuation of application No. PCT/EP2015/061263, filed on May 21, 2015.

(30) Foreign Application Priority Data

May 21, 2014 (DE) .................. 10 2014 007 372

(51) Int. Cl.
*B01D 29/21* (2006.01)
*B01D 46/52* (2006.01)
*B01D 35/00* (2006.01)

(52) U.S. Cl.
CPC .......... *B01D 29/21* (2013.01); *B01D 35/005* (2013.01); *B01D 46/522* (2013.01);
(Continued)

(58) Field of Classification Search
CPC ...... B01D 46/04; B01D 46/522; B01D 29/21; B01D 2201/122; B01D 29/33;
(Continued)

(56) References Cited

U.S. PATENT DOCUMENTS 6,312,489 B1 11/2001 Ernst et al.
2003/0213756 A1* 11/2003 Duby .................... B01D 25/26
210/791

(Continued)

FOREIGN PATENT DOCUMENTS

DE 19916704 A1 10/2000
DE 102011083657 A1 3/2013

*Primary Examiner* — Heidi R Kelley
*Assistant Examiner* — Karla Hawkins
(74) *Attorney, Agent, or Firm* — James Hasselbeck

(57) ABSTRACT

A filter insert piece has a filter element with first and second pleated sections each having parallel pleats. The first and second pleated sections each have an inflow side. A first flat outflow side of the first pleated section and a second flat outflow side of the second pleated section adjoin a common clean chamber of the filter element. A length of the pleats of the first and second pleated sections is such that a spacing of an outwardly positioned pleat end face of the pleats at the first or second inflow side, respectively, relative to the center axis increases or decreases monotonic from pleat to pleat. The respective end pleats of the first and of the second pleated sections have a different length extension measured from the outwardly positioned pleat end face of the first end pleats or the second end pleats relative to the center axis.

8 Claims, 5 Drawing Sheets

(52) U.S. Cl.
CPC ............... *B01D 2201/0415* (2013.01); *B01D 2201/122* (2013.01); *B01D 2279/40* (2013.01); *B01D 2279/60* (2013.01)

(58) Field of Classification Search
CPC .... B01D 29/56; B01D 29/122; B01D 29/333; B01D 35/05; B01D 2201/415; B01D 2279/40; B01D 2279/60
See application file for complete search history.

(56) References Cited

U.S. PATENT DOCUMENTS

2007/0157589 A1\* 7/2007 Haberkamp ......... B01D 46/522
  55/498
2015/0151233 A1\* 6/2015 Johnson ............. B01D 46/0004
  95/273

\* cited by examiner

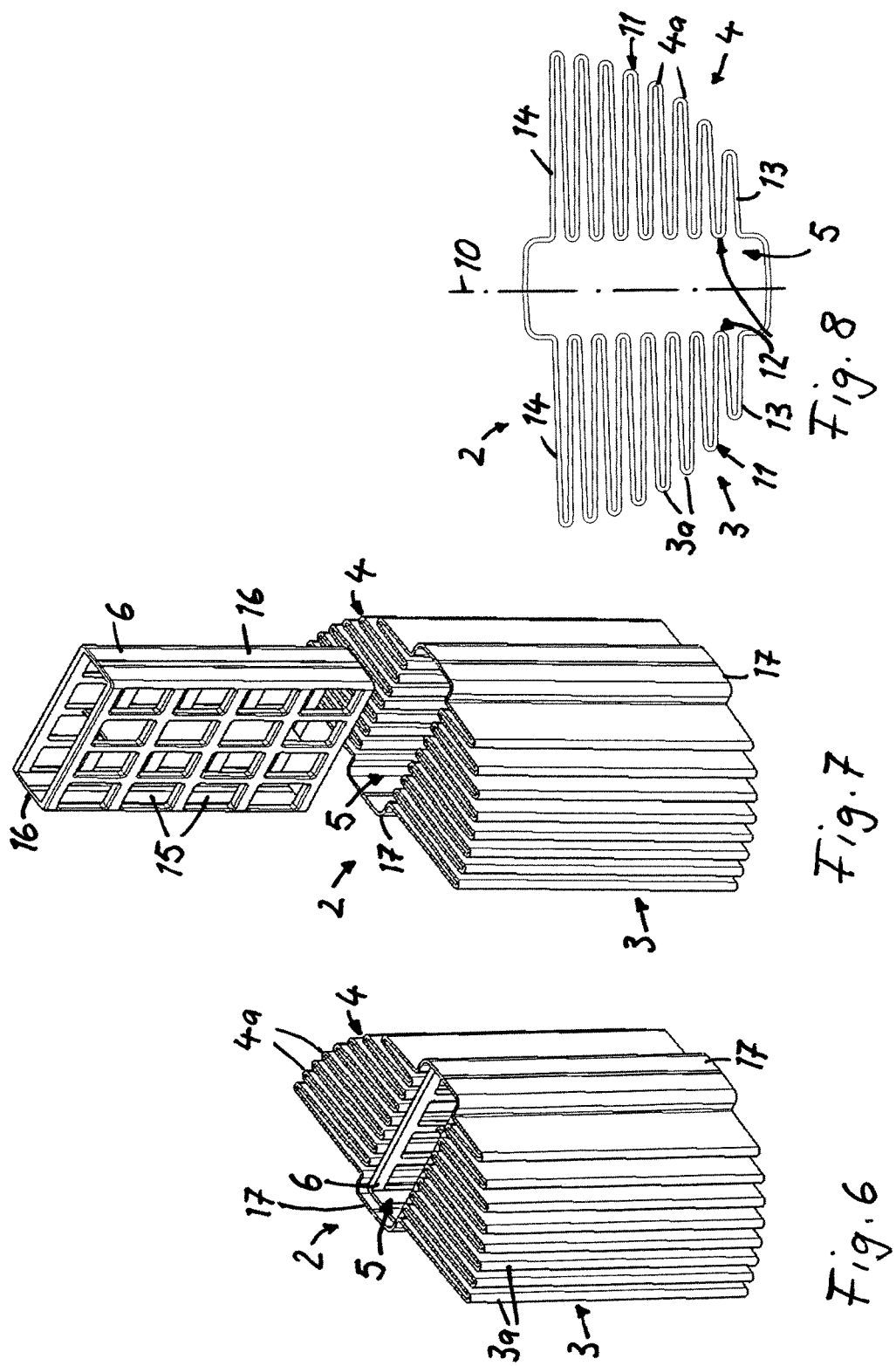

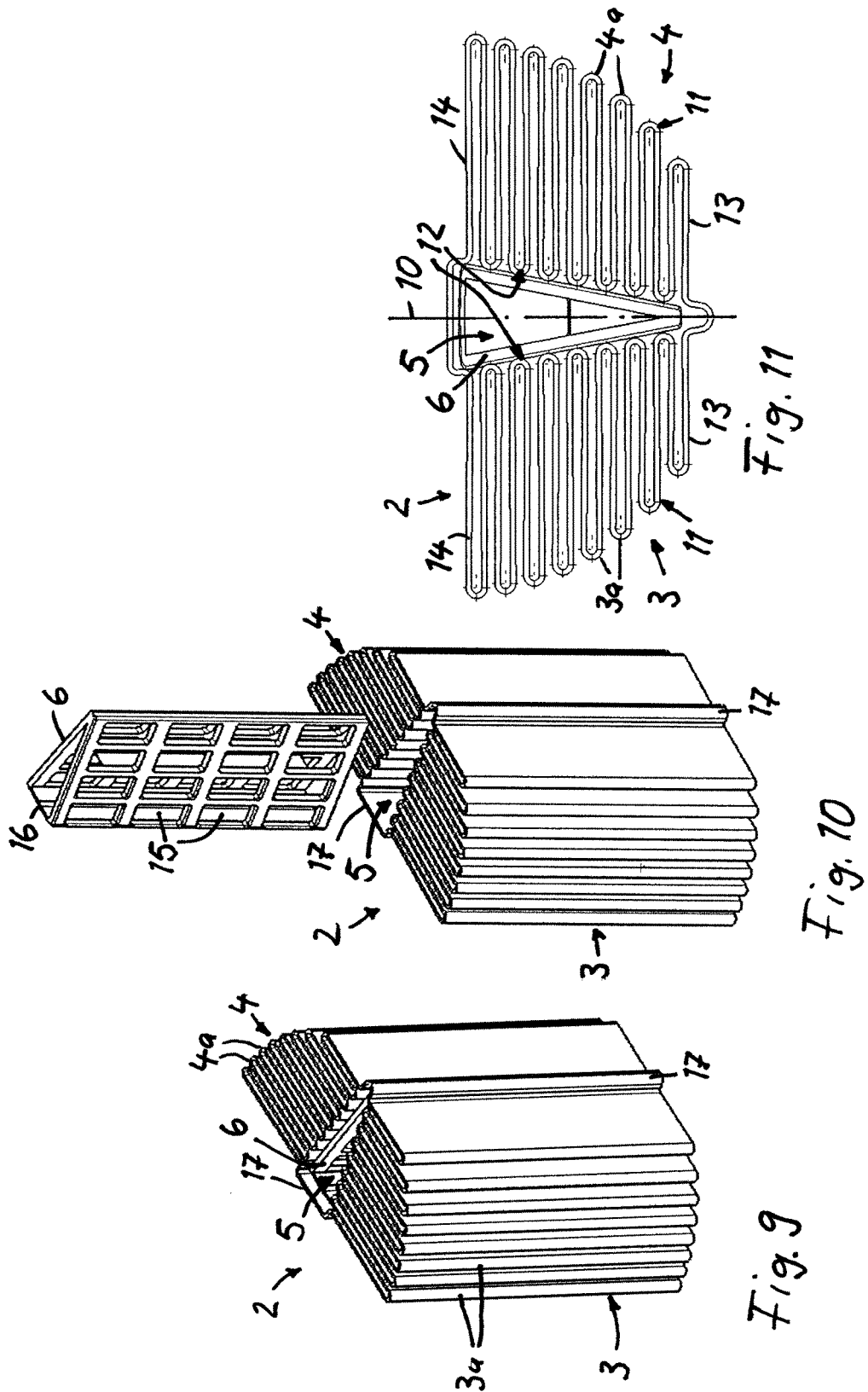

FILTER INSERT PIECE COMPRISING A PLEATED FILTER ELEMENT

CROSS-REFERENCE TO RELATED APPLICATIONS

This application is a continuation application of international application No. PCT/EP2015/061263 having an international filing date of 21 May 2015 and designating the United States, the international application claiming a priority date of 21 May 2014, based on prior filed German patent application No. 10 2014 007 372.6, the entire contents of the aforesaid international application and the aforesaid German patent application being incorporated herein by reference.

BACKGROUND OF THE INVENTION

The invention concerns a filter insert piece comprising a pleated filter element, comprising a first pleated section with parallel arranged pleats and a second pleated section with parallel arranged pleats, wherein the first and the second pleated sections have different inflow sides in the filter element and the pleated sections adjoin a common clean chamber.

EP 0 973 597 B1 discloses a filter insert piece that comprises for fluid filtration a filter element which has a fir tree-like structure. The filter element is assembled of two halves and encloses a clean chamber. The two halves each are flowed through from the exterior to the interior, wherein the purified fluid is collected in the inwardly positioned clean chamber and discharged from the latter.

U.S. Pat. No. 5,043,000 A discloses an air filter element that is cylindrically embodied and is comprised of several filter segments distributed about the circumference and each configured as a pleated filter with parallel arranged folds. In the interior of the filter element, an axially extending clean chamber for all filter segments is provided from which the purified fluid is axially discharged.

SUMMARY OF THE INVENTION

The invention has the object to design a filter insert piece with a pleated filter element with simple constructive measures in such a way that a high filtration performance is provided.

This object is solved according to the invention in that the outflow side of each pleated section adjoining the clean chamber is of a flat configuration and the length of the pleats of each pleated section is embodied in such a way that the spacing between the outwardly positioned pleat end face at the inflow side relative to a center axis of the filter element increases monotonic from pleat to pleat or decreases monotonic from pleat to pleat so that the end pleats of a pleated section have a different length extension measured between the outwardly positioned pleat end face and the center axis.

The dependent claims provide expedient further embodiments.

The filter insert piece according to the invention can be inserted into a filter housing of a filter device. The filter insert piece can be employed for filtration of liquid, in particular fuel. In principle, however, a use for filtration of gaseous fluids is also conceivable, for example, for the combustion air of internal combustion engines or for the air which is supplied to cabins, for example, into vehicle interiors.

The filter insert piece comprises a pleated filter element with at least one first and one second pleated section wherein the pleats within a pleated section extend parallel, or at least approximately parallel, to each other. Inflow of fluid to be purified occurs at the exterior side of the pleated sections. Accordingly, their exterior side forms the inflow side or raw side. At the inwardly positioned outflow side or clean side, a common clean chamber for all pleated sections is provided. The outflow side of each pleated section is embodied to be flat; accordingly, the clean chamber has a flat wall relative to each pleated section.

Moreover, it is provided that the length of the pleats in each pleated section is designed such that the spacing between the outwardly positioned pleat end face at the inflow side relative to a central axis of the filter element increases monotonic from pleat to pleat. Accordingly, the end pleats of a pleated section have a different length extension measured between the outwardly positioned pleat end face and the central axis of the filter element.

This embodiment has various advantages. In particular, a high packing density of the pleats in the filter element is possible so that even for a limited installation space a high filtration performance is provided. The exterior side of each pleated section has a curvature as a result of the different lengths of the pleats and can therefore be flexibly adapted to different installation situations. The curvature is selected such that at least two, usually a plurality of, different pleat lengths within a pleated section are provided, wherein the pleat length changes monotonic between the two outer end pleats of a pleated section, i.e., either increases or decreases. Monotonic increasing means that, beginning at an end pleat, all following pleats have at least the same or a greater length; for a monotonic decreasing gradient, the length is reduced or stays the same. In this context, it can also be advantageous that the spacing of the pleat end face at the inflow side relative to the center axis of the filter element is strictly monotonic increasing from pleat to pleat so that the spacing from pleat to pleat changes continuously and is exclusively increasing or—viewed in opposite direction—exclusively decreasing, wherein a constant spacing is precluded.

The filter element can have a circular or part-circular basic cross-section. The basic exterior side in this embodiment variant is embodied to be circular or part-circular. Conceivable are however also other curved exterior surfaces, for example, with oval or part-oval basic cross-section.

The filter element can be embodied symmetrically, in particular mirror-symmetrically. In the latter case, the pleated sections of the filter element are mirror-symmetrical to a center plane which comprises the center axis. On the opposite side of the center axis, the same number of pleated sections is provided wherein preferably in total two pleated sections are present but, if need be, also a greater number of pleated sections can be contained in the filter element.

For a mirror-symmetrical configuration, embodiments are conceivable in which the pleats of the oppositely positioned pleated sections extend parallel to each other, i.e., orthogonal to the center axis or center plane, as well as embodiments with an angular arrangement of the pleats relative to the center axis or center plane, wherein the angle is within an angle range that is greater than 0° and smaller than 90°.

The clean chamber that is common to all pleated sections and that is extending in the interior of the filter element is preferably closed at the rim and thus surrounded all around by the material of the filter element. The basic cross-section of the clean chamber is preferably angular, for example, rectangular, triangular, or of a trapezoid shape, wherein the side faces of the clean chamber within themselves are planar. The discharge of the purified fluid collected in the clean chamber is realized through the clean chamber orthogonal to the center axis.

According to a further advantageous embodiment, in the clean chamber a support structure is inserted which serves for stabilization of the filter element. The support structure is comprised preferably of plastic material and comprises, in the area of the clean chamber side faces coinciding with the outflow side of each pleated section, flow-through openings through which the purified fluid can flow into the clean chamber. It can be expedient that the support structure on at least one end face, preferably on both opposed end faces which extend between the outflow sides of the pleated sections, is designed to be fluid-tight. In this way, it is ensured that the fluid is not discharged via the end faces of the clean chamber but in orthogonal direction.

BRIEF DESCRIPTION OF THE DRAWINGS

Further advantages and expedient embodiments can be taken from the further claims, the figure description, and the drawings.

FIG. 6 shows in an embodiment variant a filter element having an exterior side embodied to be flat.

FIG. 7 shows the filter element according to FIG. 6 with a support structure to be inserted into an inwardly positioned clean chamber.

FIG. 8 shows the filter element according to FIGS. 6 and 7 in plan view.

FIGS. 9 to 11 show illustrations corresponding to FIGS. 6 to 8 with a filter element in modified embodiment in which the inwardly positioned clean chamber comprises a triangular shape.

In the Figures, same components are provided with same reference characters.

DESCRIPTION OF PREFERRED EMBODIMENTS

Figure 1:
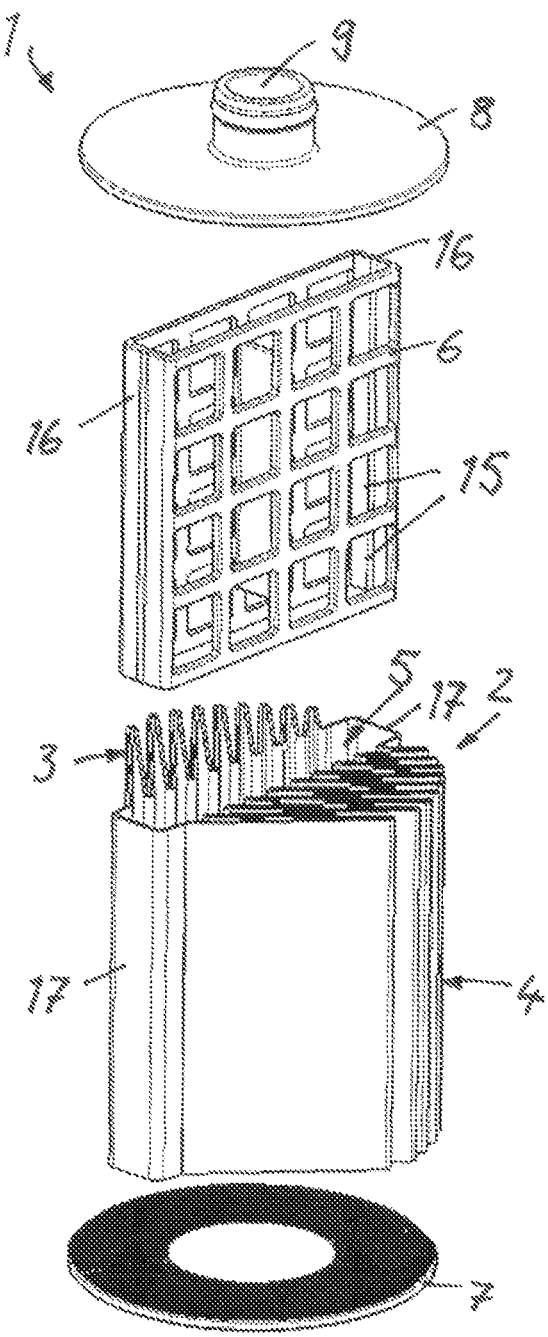
FIG. 1 shows in exploded illustration a filter insert piece with a pleated filter element that comprises two pleated sections.
Figure 3:
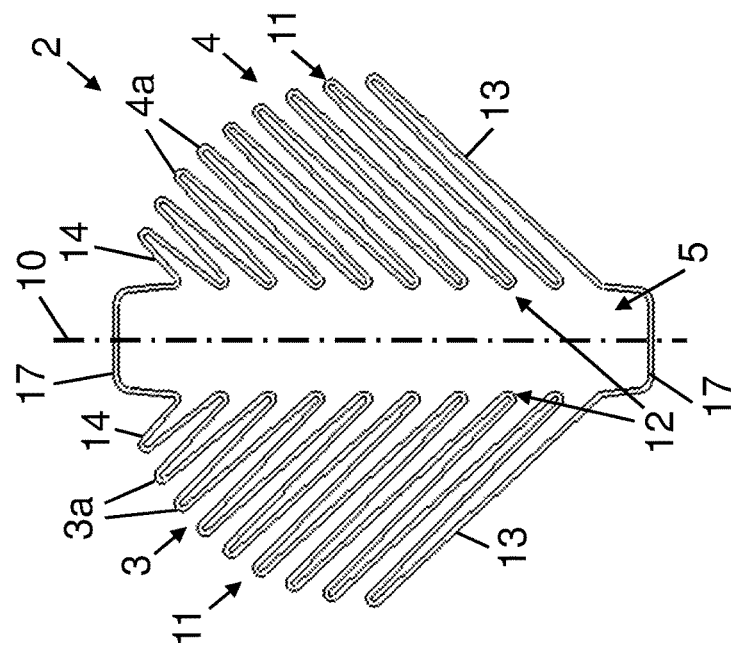
FIG. 3 is a plan view of the filter element of the filter insert piece according to FIGS. 1 and 2.
Figure 2:
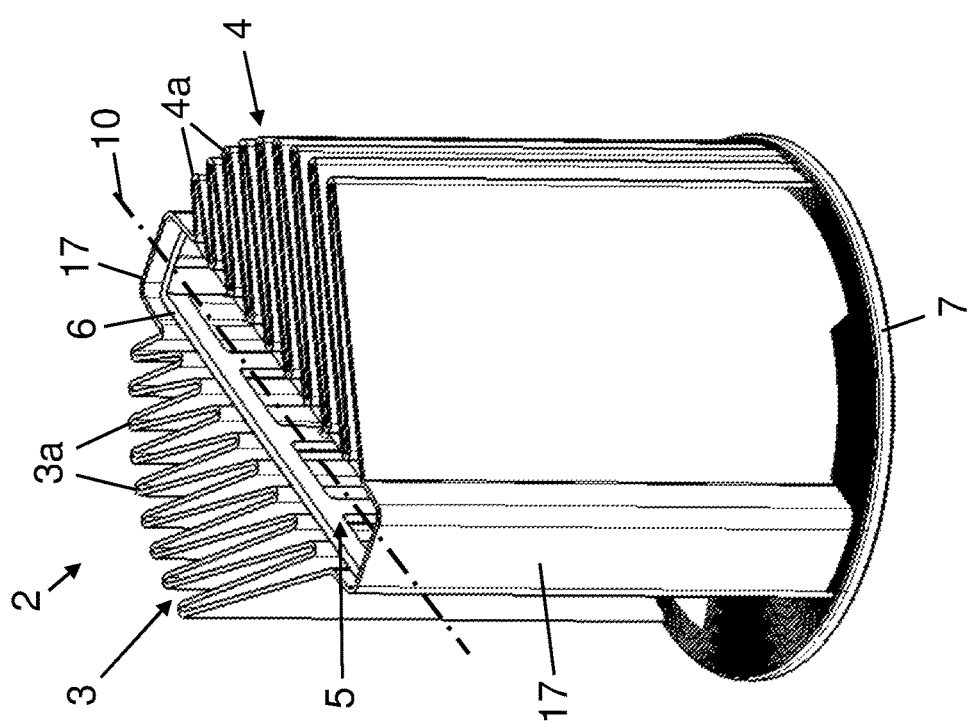
FIG. 2 shows in perspective view the filter insert piece.

The embodiment according to FIGS. 1 through 3 shows a filter insert piece 1 that is insertable into a filter housing of a filter device. The filter insert piece 1 is used, for example, for filtration of liquids, in particular of fuel.

The filter insert piece 1 comprises a filter element 2 embodied as a pleated bellows, which is flowed through radially from the exterior to the interior by the fluid to be purified and is comprised of two oppositely arranged pleated sections 3 and 4 which have a common inwardly positioned clean chamber 5. The filter insert piece 1 has also correlated therewith a support structure 6 that is insertable into the clean chamber 5 as well as end disks 7 and 8 arranged axially at the end faces and to be connected with the filter element 2, wherein one end disk 8 is provided with an outflow socket with an outflow opening 9 by means of which the purified fluid can be discharged from the clean chamber 5. The end disks 7 and 8 are connected fluid-tightly with the axial end faces of the filter element 2, for example, by gluing or fusing.

The two pleated sections 3 and 4 comprise a plurality of pleats, arranged at least approximately parallel to each other, and are mirror-symmetrically arranged relative to each other with respect to a center axis or center plane 10 (FIGS. 2, 3). The pleats of each pleated section 3, 4 are positioned relative to the center axis or center plane 10 at an angle of approximately 45°. The exterior side of each pleated section 3, 4 forms the inflow side 11; the outflow side 12 is accordingly inwardly positioned and delimits the clean chamber 5 whose sidewalls coincide with the outflow sides 12 of each pleated section 3, 4. The inflow side 11 which forms the raw side has a convexly curved course while the outflow side 12 which forms the clean side is of a flat configuration. The clean chamber 5 is positioned at the outflow side 12 of both pleated sections 3, 4.

The pleats of each pleated section 3, 4 have a changing length along the center axis 10. In particular, the spacing between the outwardly positioned pleat end faces or pleat end face edges 3a, 4a of each pleat and the center axis or center plane 10 is embodied differently. For the plurality of the pleats of each pleated section 3, 4 this spacing changes from pleat to pleat wherein, if need be, also pleats with same spacing between immediately adjacent pleats are possible. This has the result that, beginning at a first end pleat 13 toward the oppositely positioned second end pleat 14, in each pleated section 3 or 4 the spacing between the pleat end face 3a, 4a and the center axis or center plane 10 changes monotonic. The end pleat 13, together with the immediately adjacent pleat, has the greatest length; the further pleats have a shorter length wherein the oppositely positioned end pleat 14 has the shortest length. The pleats are dimensioned such that at the inflow side 11 a convex filter shape results.

The clean chamber 5 has a rectangular basic cross-section whose longitudinal sides are formed by the outflow side 12 of the pleated sections 3 and 4, respectively. As can be seen in FIG. 1, the support structure 6 is accordingly of a parallelepipedal shape wherein the sidewalls of the support structure 6 are provided with flow openings 15 by means of which the fluid can flow from the outflow side 12 of each pleated section 3, 4 into the clean chamber 5. The two oppositely positioned end faces 16 of the support structure 6, which form the narrow sides, have no flow openings on the other hand; they are instead of a continuous or flow-tight configuration. In the inserted state, the end faces 16 of the support structure 6 border a filter section 17 of the filter element 2 that connects the two pleated sections 3 and 4 with each other. The discharge is realized orthogonally to the center axis 10 as well as orthogonally to the flow-through direction of the pleated sections 3, 4 via the outflow opening 9 of the upper end disk 8.

Figure 5:
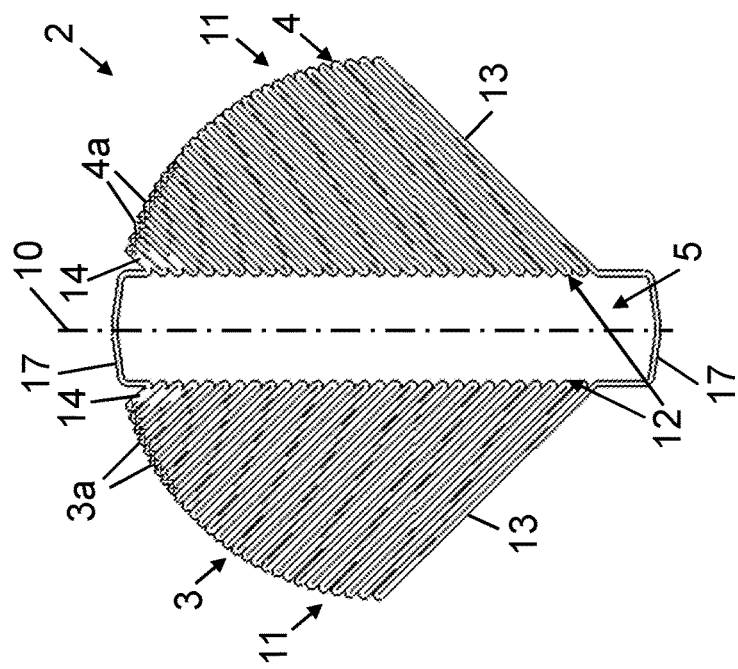
FIGS. 4 and 5 show illustrations corresponding to FIGS. 2 and 3 but with a pleated filter element with more densely packed pleats.
Figure 4:
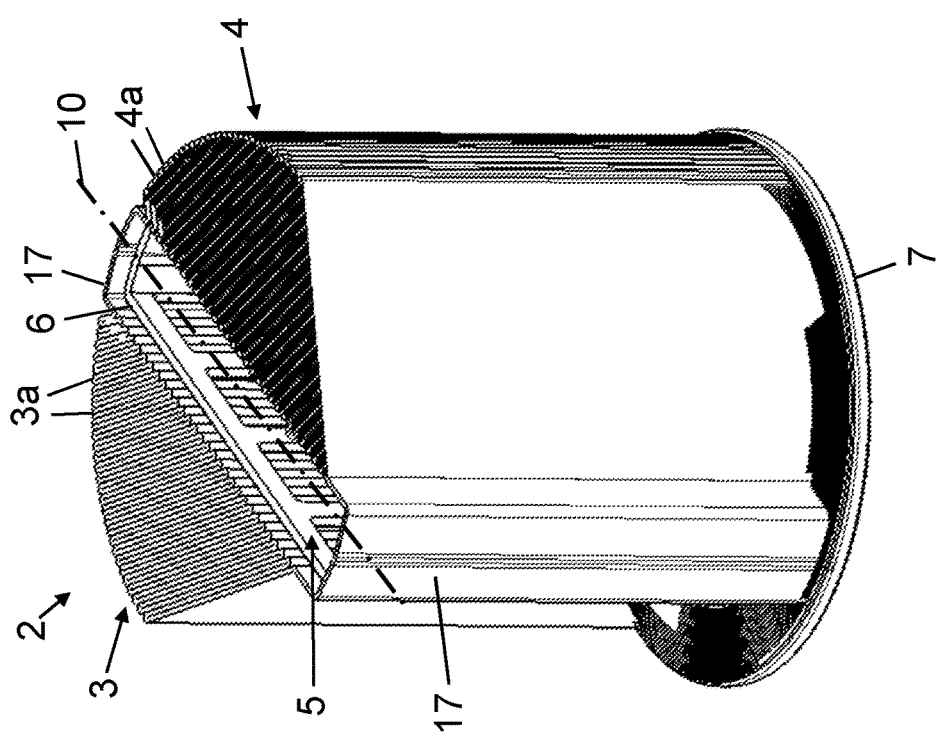

The embodiment according to FIGS. 4 and 5 corresponds to the illustration of the first embodiment according to FIGS. 2 and 3. In the first embodiment, the pleats of the pleated sections 3 and 4 are approximately positioned parallel but at a minimal spacing relative to each other. In the second embodiment according to FIGS. 4 and 5, the pleats in each pleated section 3, 4 are oriented also parallel to each other; however, they are positioned immediately adjacent to each other and contact each other so that a higher pleat packing density is achieved.

In FIGS. 6 to 8, a further embodiment of a filter element 2 is illustrated which is embodied as a pleated filter and comprises, mirror-symmetrical to the longitudinal center axis or longitudinal center plane, two pleated sections 3 and 4 whose pleats have a different length relative to the longitudinal center axis 10. In this embodiment, the outflow side 12 which delimits the clean chamber 5 is also positioned in a common plane for all pleats of a pleated section 3, 4. The inflow side 11 with the pleated end faces 3a or 4a of each pleated section 3 or 4, on the other hand, has a convexly curved course which is produced in that the length of the pleats increases continuously, i.e., strictly monotonic, starting at an end pleat 13 and extending to the oppositely positioned end pleat 14.

The clean chamber 5, as in the preceding embodiments, is embodied with a rectangular basic cross-section and, accordingly, the support structure 6 inserted into the clean chamber 5 is of a parallelepipedal shape. The lateral walls of the support structure 6 which are contacting immediately the outflow sides 12 of the pleated sections 3 and 4 are provided with flow openings 15 while the end faces 16 which form the narrow sides of the support structure 6 are embodied continuously and thus flow-tightly. The end faces 16 of the support structure 6 in the inserted state are engaged across by the filter sections 17 of the filter element 2 wherein the filter sections 17 connect the two pleated sections 3 and 4 with each other.

In the embodiment according to FIGS. 9 to 11, the filter element 2 is also embodied with two pleated sections 3 and 4 embodied mirror-symmetrical relative to the center axis or center plane 10 wherein the pleats of the pleated sections 3 and 4 are extending parallel to each other and orthogonally relative to the center axis 10.

The clean chamber 5 comprises a triangular basic cross-section with legs of the same length which are contacting the outflow sides or clean sides 12 of the pleated sections 3 and 4 which are of flat configuration. The inflow side or raw side 11 of each pleated section 3 or 4, on the other hand, is convexly curved as in the embodiment of FIGS. 6 to 8 wherein the length of the pleats of each pleated section increases continuously and thus strictly monotonic starting at an end pleat 13 toward the oppositely positioned end pleat 14.

In the embodiments according to FIGS. 6 to 8 as well as FIGS. 9 to 11, the filter element 2 has a basic cross-section with a flat exterior side which is formed by the longer end pleats 14 of the two pleated sections 3, 4. At the diametrically opposed side there is also a flat exterior side which is formed by the shorter end pleats 13 of the two pleated sections 3, 4.

While specific embodiments of the invention have been shown and described in detail to illustrate the inventive principles, it will be understood that the invention may be embodied otherwise without departing from such principles.

What is claimed is:

1. A filter insert piece comprising:
a pleated filter element comprising a first pleated section with parallel arranged pleats and a second pleated section with parallel arranged pleats, wherein the filter element has a center plane;
wherein the first pleated section is arranged on an opposite side of the center plane from the second pleated section;
wherein the first pleated section has a first inflow side and the second pleated section has a second inflow side;
a common clean chamber arranged between the first pleated section and the second pleated section, wherein a first outflow side of the first pleated section and a second outflow side of the second pleated section adjoin the common clean chamber, wherein the first and second outflow sides have a flat configuration;
wherein the first pleat section is parallel to the second pleat section, the center plane is arranged between the pleat sections and is parallel to both the first and second pleat sections;
wherein the first pleated section has a first pleat at a first axial end of the first pleated section and a last pleat at an opposite second axial end of the first pleated section, wherein pleats from the first pleat to the last pleat extend outwardly approximately parallel to each other at a first angle relative to the center plane;
wherein the second pleated section has a first pleat at a first axial end of the second pleated section and a last pleat at an opposite second axial end of the second pleated section, wherein pleats from the first pleat of the second pleat section to the last pleat of the second pleat section extend outwardly approximately parallel to each other at a second angle relative to the center plane, the first angle mirror symmetric to the second angle;
wherein each pleat has a length extension measured from its outwardly positioned pleat end face to the center plane;
wherein the length extension of the pleats of the first pleated section and the second pleated section, pleats taken sequentially from the first pleat to the last pleat of each pleated section, increase monotonically pleat to pleat from the first pleat to the last pleat of each pleated section;
a support structure arranged in the common clean chamber, the support structure including:
a first side face upon which the first pleated section is arranged, the first side face having flow through openings for fluid flow from the first pleated section to enter an interior of the support structure;
an opposite second side face upon which the second pleated section is arranged, the second side face having flow-through openings for fluid flow from the second pleated section to enter an interior of the support structure;
a first end face connecting an axial end of the first side face and the opposite second side face;
a second end face connecting an opposite axial end of the first side face and the opposite second side face.

2. The filter insert piece according to claim 1, wherein pleats of the first pleated section are mirror-symmetric to pleats of the second pleated section relative to the center plane.

3. The filter insert piece according to claim 2, wherein the pleats of the first and second pleated sections are orthogonally oriented relative to the center plane.

4. The filter insert piece according to claim 2, wherein the pleats of the first and second pleated sections are positioned at an angle of greater than 0° and smaller than 90° relative to the center plane.

5. The filter insert piece according to claim 1, wherein the clean chamber has an angular basic cross-section.

6. The filter insert piece according to claim 5, wherein the basic cross-section is rectangular or triangular.

7. The filter insert piece according to claim 1, wherein the clean chamber is enclosed by a filter medium of the filter element.

8. The filter insert piece according to claim 1, wherein the filter element has a circular basic cross-section or a part-circular basic cross-section.

* * * * *